United States Patent
Fujino (10) Patent No.: US 12,255,480 B2
(45) Date of Patent: Mar. 18, 2025

(54) CHARGING DEVICE

(71) Applicant: SUBARU CORPORATION, Tokyo (JP)

(72) Inventor: Takahito Fujino, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 529 days.

(21) Appl. No.: 17/579,238

(22) Filed: Jan. 19, 2022

(65) Prior Publication Data
US 2022/0255334 A1 Aug. 11, 2022

(30) Foreign Application Priority Data
Feb. 10, 2021 (JP) .................................. 2021-019626

(51) Int. Cl.
*H02J 7/00* (2006.01)
*B60L 53/16* (2019.01)
*B60L 53/62* (2019.01)

(52) U.S. Cl.
CPC ............ *H02J 7/0071* (2020.01); *B60L 53/16* (2019.02); *B60L 53/62* (2019.02); *H02J 7/0049* (2020.01); *H02J 7/005* (2020.01); *H02J 7/00718* (2020.01)

(58) Field of Classification Search
CPC ........ H02J 7/0071; H02J 7/0049; H02J 7/005; H02J 7/00718; H02J 7/007188; H02J 2310/48; H02J 7/007; H02J 7/0029; H02J 7/0048; B60L 53/16; B60L 53/62; B60L 58/16
See application file for complete search history.

(56) References Cited

U.S. PATENT DOCUMENTS

| | | | | |
|---|---|---|---|---|
| 5,202,617 A | * | 4/1993 | Nor ......................... | B60L 53/65 320/152 |
| 2001/0035732 A1 | * | 11/2001 | Sakakibara ........... | H02J 7/0071 320/137 |
| 2010/0201323 A1 | * | 8/2010 | Okamura .............. | H02J 7/0031 320/134 |
| 2014/0167706 A1 | * | 6/2014 | Sun ..................... | H02J 7/00718 320/160 |
| 2018/0183254 A1 | * | 6/2018 | Park .................... | H01M 10/425 |

(Continued)

FOREIGN PATENT DOCUMENTS

| | | |
|---|---|---|
| JP | 2012-135148 A | 7/2012 |
| JP | 2018-196248 A | 12/2018 |
| WO | 2014-147973 A | 2/2017 |

OTHER PUBLICATIONS

Japanese Office Action in JPA No. 2021-019626 issued on Nov. 12, 2024 with English translation thereof.

*Primary Examiner* — Stacy Whitmore
(74) *Attorney, Agent, or Firm* — McGinn IP Law Group, PLLC (57) ABSTRACT

A charging device to be applied to a vehicle includes a charging inlet and a charging controller. The charging inlet is to be disposed in the vehicle and is configured to be coupled to a charging connector outside the vehicle. The charging controller is configured to execute charging of an in-vehicle battery disposed in the vehicle with power fed from an outside of the vehicle through the charging inlet. The charging controller is configured to limit a charging current so as to reduce an amount of decrease in charging time resulting from an increase in how many times the charging is executed.

17 Claims, 6 Drawing Sheets

(56) References Cited

U.S. PATENT DOCUMENTS

| | | | |
|---|---|---|---|
| 2019/0020201 A1* | 1/2019 | Liang | H02J 7/0071 |
| 2020/0119411 A1* | 4/2020 | Krasovitsky | H02J 7/005 |
| 2021/0016675 A1* | 1/2021 | Jefferies | H02J 7/0013 |
| 2022/0109195 A1* | 4/2022 | Morimoto | H01M 10/44 |
| 2023/0182618 A1* | 6/2023 | Nam | B60L 58/12 |
| | | | 320/127 |
| 2024/0222721 A1* | 7/2024 | Ghantous | H02J 7/0047 |

\* cited by examiner

CHARGING DEVICE

CROSS-REFERENCE TO RELATED APPLICATIONS

The present application claims priority from Japanese Patent Application No. 2021-019626 filed on Feb. 10, 2021, the entire contents of which are hereby incorporated by reference.

BACKGROUND

The disclosure relates to a charging device for an in-vehicle battery.

For example, Japanese Unexamined Patent Application Publication No. 2012-135148 discloses an example of a technique of charging an in-vehicle battery with power fed to a vehicle from the outside of the vehicle.

SUMMARY

An aspect of the disclosure provides a charging device to be applied to a vehicle. The charging device includes a charging inlet and a charging controller. The charging inlet is to be disposed in the vehicle and is configured to be coupled to a charging connector outside the vehicle. The charging controller is configured to execute charging of an in-vehicle battery disposed in the vehicle with power fed from an outside of the vehicle through the charging inlet. The charging controller is configured to limit a charging current so as to reduce an amount of decrease in charging time resulting from an increase in how many times the charging is executed.

An aspect of the disclosure provides a charging device to be applied to a vehicle. The charging device includes a charging inlet and circuitry. The charging inlet is to be disposed in the vehicle and is configured to be coupled to a charging connector outside the vehicle. The circuitry is configured to execute charging of an in-vehicle battery disposed in the vehicle with power fed from an outside of the vehicle through the charging inlet. The circuitry is configured to limit a charging current so as to reduce an amount of decrease in charging time resulting from an increase in how many times the charging is executed.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to explain the principles of the disclosure.

DETAILED DESCRIPTION

A lithium-ion battery, which is an example of an in-vehicle battery, has a property of easily being degraded under a high temperature environment. This type of in-vehicle battery increases in internal resistance as degradation progresses. Accordingly, an increase in the amount of heat generation resulting from the internal resistance may raise the temperature of the in-vehicle battery and may promote degradation of the in-vehicle battery.

It is desirable to provide a charging device capable of suppressing degradation of an in-vehicle battery.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
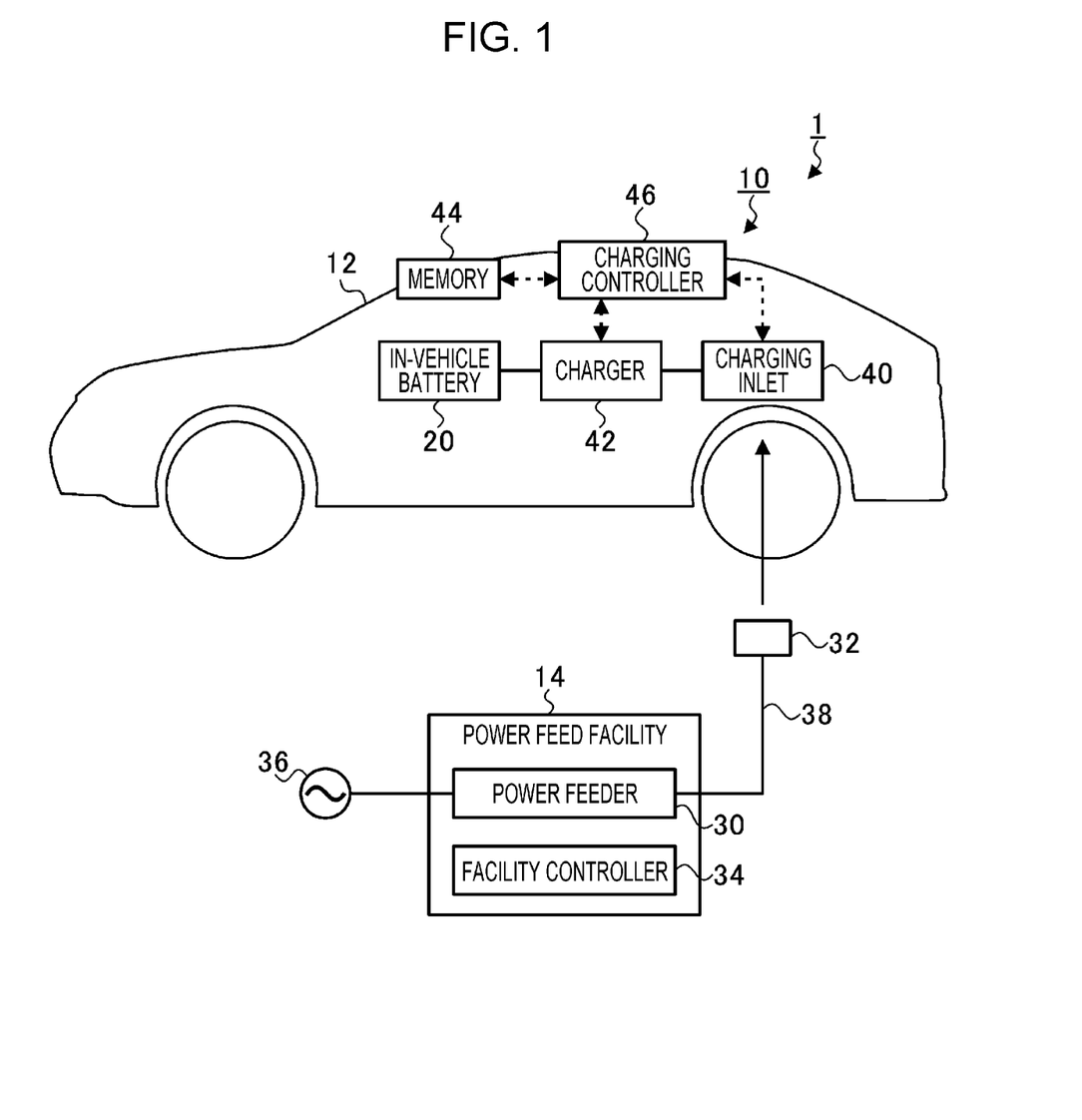
FIG. 1 is a schematic diagram illustrating the configuration of a charging system according to an embodiment.

FIG. 1 is a schematic diagram illustrating the configuration of a charging system 1 according to the present embodiment. The charging system 1 includes a vehicle 12 to which a charging device 10 is applied, and a power feed facility 14 outside the vehicle 12.

The vehicle 12 is, for example, an electric vehicle or a hybrid vehicle. The vehicle 12 is equipped with an in-vehicle battery 20. The in-vehicle battery 20 is, for example, a lithium-ion battery. The in-vehicle battery 20 feeds power to a motor (not illustrated), which is a drive source of the vehicle 12. Although the details will be described below, the charging device 10 is capable of being electrically coupled to the power feed facility 14, and charges the in-vehicle battery 20 with power fed from the power feed facility 14. That is, the charging device 10 is capable of executing so-called plug-in charging.

The power feed facility 14 includes a power feeder 30, a charging connector 32, and a facility controller 34. The power feeder 30 is coupled to a power source 36. The power source 36 is, for example, a commercial power system. The charging connector 32 is coupled to the power feeder 30 through a cable 38. The charging connector 32 is capable of being electrically coupled to the charging device 10 of the vehicle 12. The power feeder 30 converts alternating-current (AC) power fed from the power source 36 into direct-current (DC) power, and feeds the DC power to the charging device 10 of the vehicle 12 through the charging connector 32. The power feeder 30 is not limited to the configuration of feeding DC power to the charging device 10, and may have a configuration of feeding AC power to the charging device 10. The charging connector 32 has an end portion in which a terminal arrangement or a socket shape varies between use for feeding DC power and use for feeding AC power.

The facility controller 34 is a computer constituted by a semiconductor integrated circuit including a central processing unit, a read only memory (ROM) storing a program and the like, and a random access memory (RAM) serving as a work area. The facility controller 34 controls the entire power feed facility 14 in cooperation with the program. The facility controller 34 is capable of communicating with the charging device 10 of the vehicle 12 through the charging connector 32 and the cable 38. The facility controller 34 causes the power feeder 30 to start feeding power to the vehicle 12 in response to an instruction to start charging, and causes the power feeder 30 to end feeding power to the vehicle 12 in response to an instruction to end charging. The facility controller 34 is capable of controlling the amount of power to be fed by the power feeder 30.

The charging device 10 includes a charging inlet 40, a charger 42, a memory 44, and a charging controller 46. The charging inlet 40 is disposed, for example, on a side surface of a body of the vehicle 12. The charging connector 32 is capable of being coupled to the charging inlet 40. The charging inlet 40 is capable of receiving power from the power feed facility 14 through the charging connector 32.

The charging inlet 40 is electrically coupled to the in-vehicle battery 20 via the charger 42. The charger 42 includes a switch for turning on/off an electrical coupling between the charging inlet 40 and the in-vehicle battery 20. The charger 42 also includes a current measurer that measures a charging current flowing into the in-vehicle battery 20. The charger 42 also includes a voltage measurer that measures a voltage of the in-vehicle battery 20. In response to receipt of AC power, the charger 42 converts the AC power into DC power, and feeds the DC power to the in-vehicle battery 20.

The memory 44 is constituted by a non-volatile storage element. The memory 44 stores a limit value of charging current. The limit value of charging current, which will be described below, corresponds to a target value of charging current for charging the in-vehicle battery 20, and is used to control charging.

The charging controller 46 is a computer constituted by a semiconductor integrated circuit including a central processing unit, a ROM storing a program and the like, and a RAM serving as a work area. The charging controller 46 executes charging of the in-vehicle battery 20 with power fed from the outside of the vehicle 12 through the charging inlet 40, in cooperation with the program.

Figure 2A:
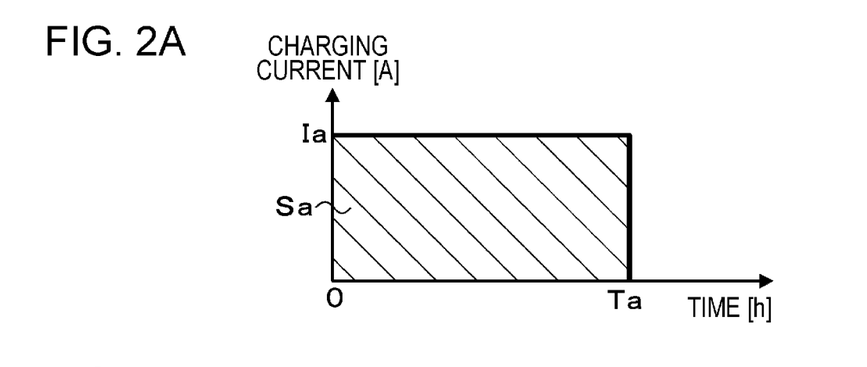
FIG. 2A is a diagram describing an outline of an operation of a charging controller and illustrating an initial charging capacity of an in-vehicle battery that has hardly degraded.
Figure 2B:
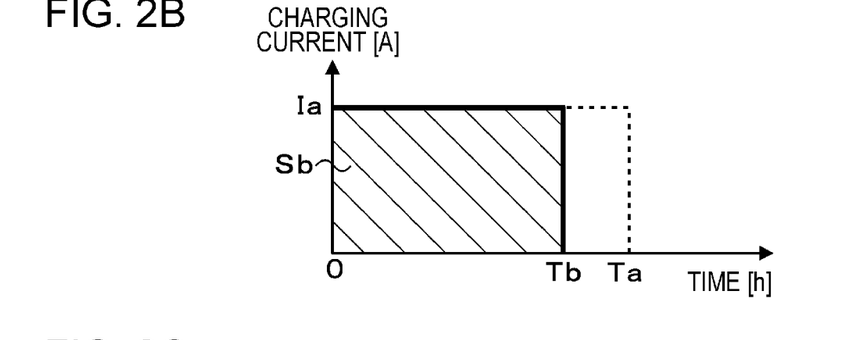
FIG. 2B is a diagram describing the outline of the operation of the charging controller and illustrating a charging capacity of the in-vehicle battery that has degraded compared with FIG. 2A.
Figure 2C:
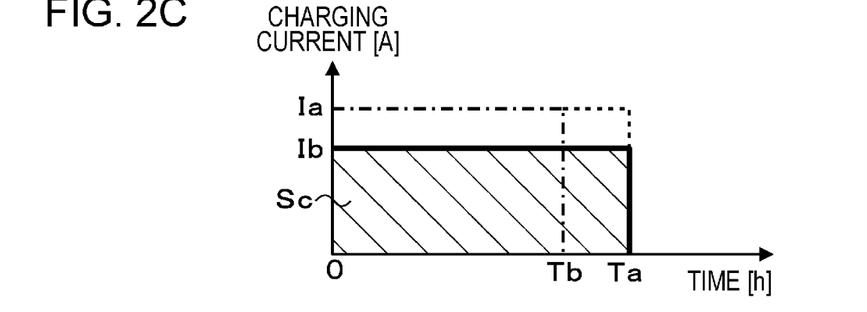
FIG. 2C is a diagram describing the outline of the operation of the charging controller and illustrating an example in which a charging current is limited.
Figure 2D:
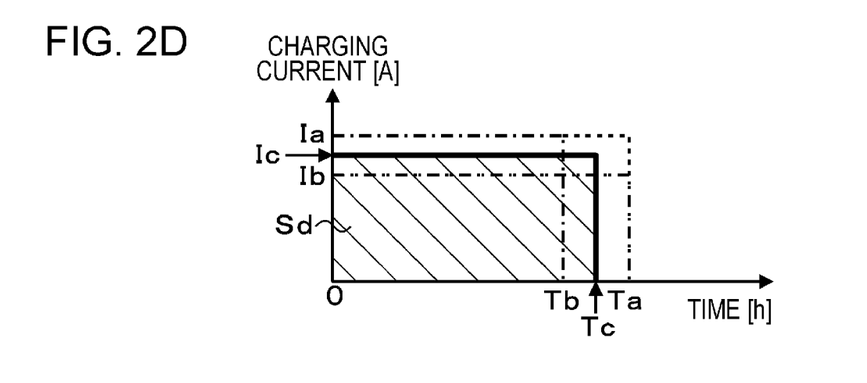
FIG. 2D is a diagram describing the outline of the operation of the charging controller and illustrating another example in which a charging current is limited.

FIGS. 2A to 2D are diagrams describing an outline of an operation of the charging controller 46. FIG. 2A illustrates an initial charging capacity of the in-vehicle battery 20 that has hardly degraded. FIG. 2B illustrates a charging capacity of the in-vehicle battery 20 that has degraded compared with FIG. 2A. FIG. 2C illustrates an example in which a charging current is limited. FIG. 2D illustrates another example in which a charging current is limited. In FIGS. 2A to 2D, it is assumed that, for convenience of description, the in-vehicle battery 20 is charged until a state of charge (SOC) of the in-vehicle battery 20 reaches 100% from 0%.

In FIG. 2A, it is assumed that a charging current Ia is supplied to the in-vehicle battery 20 for a charging time Ta, so that the SOC reaches 100%. The charging capacity at this time is a value calculated by multiplying the charging current by the charging time, and thus corresponds to an area Sa indicated by the hatching in FIG. 2A.

In FIG. 2B, degradation of the in-vehicle battery 20 has progressed compared with FIG. 2A. As the degradation progresses, the charging capacity decreases. The charging capacity illustrated in FIG. 2B corresponds to an area Sb indicated by the hatching in FIG. 2B. The area Sb is smaller than the area Sa. In FIG. 2B, as in FIG. 2A, it is assumed that the charging current Ia is supplied to the in-vehicle battery 20 to execute charging. In FIG. 2B, however, the charging capacity has decreased. Thus, the SOC reaches 100% in a charging time Tb shorter than the charging time Ta, if the charging current Ia is the same.

A lithium-ion battery, which is an example of the in-vehicle battery 20, has a property of easily being degraded under a high temperature environment. The progress of degradation causes an increase in the internal resistance of the in-vehicle battery 20. Thus, if charging is executed, after the progress of degradation, with the same charging current as that before the progress of degradation (for example, the charging current Ia), the amount of heat generation resulting from the internal resistance of the in-vehicle battery 20 increases compared with that before the progress of degradation. Accordingly, the temperature of the in-vehicle battery 20 after the progress of degradation becomes higher than that before the progress of degradation, which may further promote degradation of the in-vehicle battery 20.

The further promotion of degradation of the in-vehicle battery 20 further decreases the charging capacity. If charging is repeated with the same charging current as that before the progress of degradation (for example, the charging current Ia), the charging time further shortens as the charging capacity decreases. In this way, degradation progresses as the number of executions of charging increases, and the charging time shortens as the degradation progresses.

Thus, the charging controller 46 limits the charging current so as to reduce the amount of decrease in the charging time resulting from an increase in the number of executions of charging. At this time, the charging controller 46 derives a limit value of charging current, and transmits the limit value of charging current to the facility controller 34 through the charging inlet 40. The facility controller 34 controls the power feeder 30 so that the current of the power fed through the charging connector 32 is smaller than or equal to the received limit value. Accordingly, the charging current supplied to the in-vehicle battery 20 is limited to being smaller than or equal to the limit value.

In more detail, as illustrated in FIG. 2C, the charging controller 46 limits the charging current supplied to the in-vehicle battery 20 to a charging current Ib smaller than the charging current Ia so that the charging time is equal to the charging time Ta. In other words, the charging controller 46 limits the charging current so that the charging time of present charging relatively corresponding to charging after the progress of degradation is equal to the charging time of last charging relatively corresponding to charging before the progress of degradation (for example, the charging time Ta). The charging current Ib in FIG. 2C corresponds to the limit value of charging current. The charging capacity obtained when the charging current is limited to the charging current Ib is a value calculated by multiplying the charging current Ib by the charging time Ta, and corresponds to an area Sc indicated by the hatching in FIG. 2C. That is, the charging current Ib is set to a value that makes the area Sc equal to the area Sb when the charging time is Ta.

Even if the internal resistance of the in-vehicle battery 20 increases due to the progress of degradation, it is possible to suppress an increase in the amount of heat generation resulting from the internal resistance by limiting the charging current to the charging current Ib from the charging current Ia, as illustrated in FIG. 2C. That is, even if degradation progresses, it is possible to suppress an increase in the temperature of the in-vehicle battery 20. As a result, it is possible to suppress further degradation resulting from an increase in the temperature of the in-vehicle battery 20.

The charging controller 46 is not limited to the configuration of limiting the charging current so that the charging time is equal to the charging time Ta before the progress of degradation. The charging controller 46 may limit the charging current so that the charging time is at least longer than the charging time Tb before limitation of the charging current.

In one example, as illustrated in FIG. 2D, the charging controller 46 may limit the charging current so that the charging time is equal to a charging time Tc, which is longer than the charging time Tb for charging with the charging current Ia after the progress of degradation and is shorter than or equal to the charging time Ta. That is, the charging time is shortened from the charging time Ta to the charging time Tc, not from the charging time Ta to the charging time Tb, and thus the amount of decrease in the charging time is reduced.

In this case, the charging current is limited to a charging current Ic, which is smaller than the charging current Ia and is larger than or equal to the charging current Ib that is used to execute charging for the charging time Ta after the progress of degradation. At this time, the charging current Ic corresponds to the limit value of charging current. The charging capacity obtained when the charging current is limited to the charging current Ic is a value calculated by multiplying the charging current Ic by the charging time Tc, and corresponds to an area Sd indicated by the hatching in FIG. 2D. That is, the charging current Ic is set to a value that makes the area Sd equal to the area Sb when the charging time is Tc. As described above, a combination of a predetermined charging time (for example, the charging time Tc) and a predetermined limit value of charging current (for example, the charging current Ic) can be optionally set under a condition in which the charging capacity is equal.

As illustrated in FIG. 2D, the charging controller 46 limits the charging current so as to reduce the amount of decrease in the charging time, and is thus capable of suppressing an increase in the amount of heat generation resulting from the internal resistance of the in-vehicle battery 20, compared with the case of not limiting the charging current. As a result, it is possible to suppress further degradation resulting from an increase in the temperature of the in-vehicle battery 20.

In the example in FIG. 2C, the degree of limitation on the charging current is higher than in the example in FIG. 2D. Thus, the example in FIG. 2C is capable of further reducing the progress speed of degradation of the in-vehicle battery 20 than the example in FIG. 2D.

In FIG. 2D, the charging time Tc is shorter than or equal to the charging time Ta. Alternatively, the charging controller 46 may limit the charging current so that the charging time is longer than the charging time Ta before the progress of degradation. This configuration makes it possible to further suppress degradation of the in-vehicle battery 20, although user convenience may decrease because of the charging time longer than before the progress of degradation.

Figure 3A:
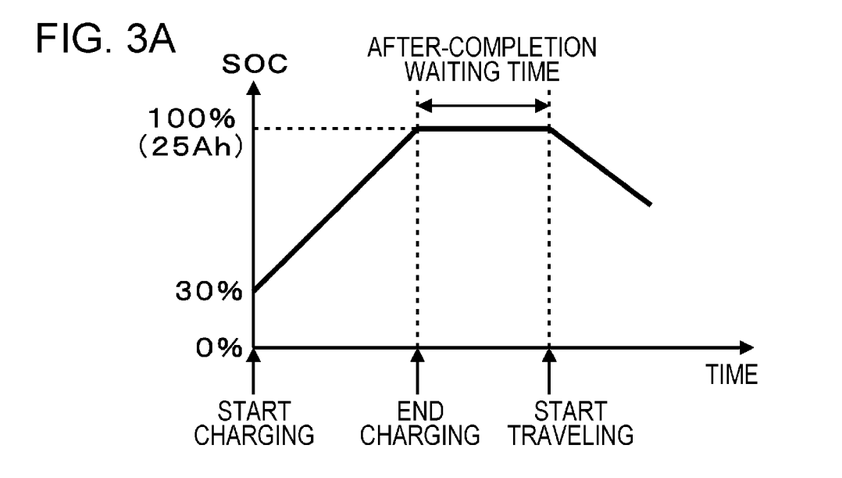
FIG. 3A is a diagram illustrating an example of a temporal transition of a SOC during charging and after charging of the in-vehicle battery in an initial state that has hardly degraded.
Figure 3B:
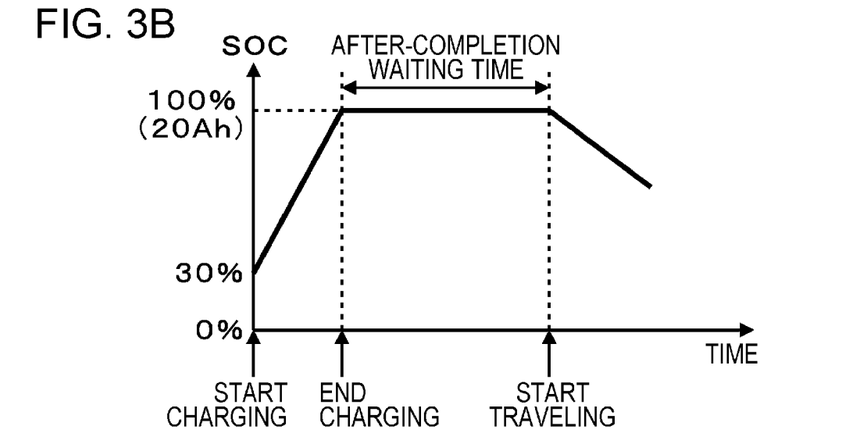
FIG. 3B is a diagram illustrating an example of a temporal transition of a SOC during charging and after charging of the in-vehicle battery that has degraded compared with FIG. 3A.
Figure 3C:
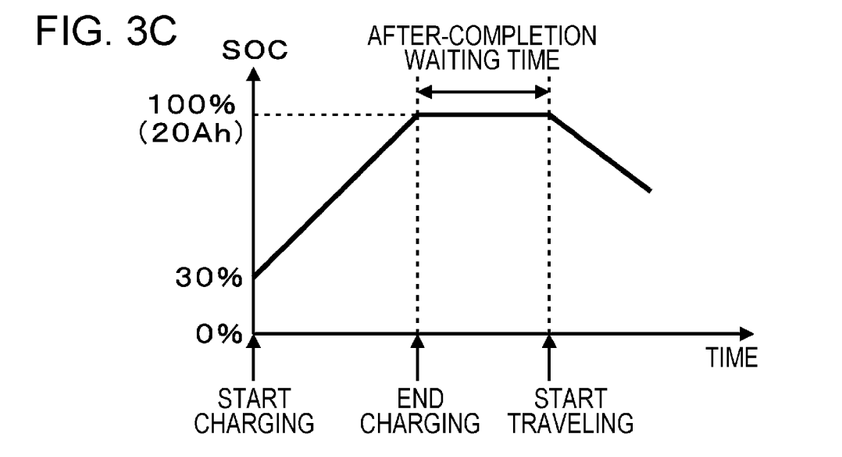
FIG. 3C is a diagram illustrating an example of a temporal transition of a SOC during charging and after charging in a case where a charging current is limited by the charging controller.

FIGS. 3A to 3C are diagrams illustrating examples of a temporal transition of the SOC during charging and after charging. FIG. 3A illustrates a temporal transition of the SOC of the in-vehicle battery 20 in an initial state that has hardly degraded. FIG. 3B illustrates a temporal transition of the SOC of the in-vehicle battery 20 that has degraded compared with FIG. 3A. FIG. 3C illustrates a case where the charging current is limited by the charging controller 46. FIGS. 3A to 3C are illustrated with a common time axis, and it is assumed that the time from start of charging to start of traveling of the vehicle 12 is the same.

In FIG. 3A, it is assumed that, for example, the charging capacity is 25 Ah when the SOC is 100%. It is also assumed that the SOC is 30% at start of charging and that charging is executed until the SOC reaches 100%. At the time of charging, charging is executed until the charging capacity of the in-vehicle battery 20 reaches 25 Ah. The SOC is kept at 100% during a predetermined after-completion waiting time from end of charging to start of traveling.

In contrast, in FIG. 3B, it is assumed that, for example, the charging capacity is 20 Ah when the SOC is 100% due to the progress of degradation of the in-vehicle battery 20. In FIG. 3B, as in FIG. 3A, it is assumed that charging is executed until the SOC reaches 100% from 30%. However, in the example in FIG. 3B, compared with the example in FIG. 3A, the charging capacity has decreased although the SOC is 100%, and thus the charging time from start of charging to end of charging is shorter. Accordingly, in the example in FIG. 3B, compared with the example in FIG. 3A, the after-completion waiting time is longer and thus the time during which the SOC is kept at 100% is longer.

A lithium-ion battery, which is an example of the in-vehicle battery 20, has a property of easily being degraded if a high SOC state (for example, a state in which the SOC is 100%) continues for a long time. Thus, if the after-completion waiting time during which the SOC is 100% is long, as in the example in FIG. 3B, degradation of the in-vehicle battery 20 may further be promoted.

However, the charging controller 46 limits the charging current so as to reduce the amount of decrease in the charging time resulting from an increase in the number of executions of charging, as described above. For example, the charging controller 46 limits the charging current so that the charging time after the progress of degradation is equal to the charging time before the progress of degradation (see FIG. 2C).

Accordingly, for example, as illustrated in FIG. 3C, the charging time from start of charging to end of charging can be made equal to that in the example in FIG. 3A, even if the charging capacity when the SOC is 100% is smaller than that in the example in FIG. 3A. Accordingly, in the example in FIG. 3C, the after-completion waiting time from end of charging to start of traveling can be made equal to that in the example in FIG. 3A. Thus, the charging controller 46 is capable of shortening the time during which the SOC is kept at 100% after charging, compared with the example in FIG. 3B. As a result, it is possible to suppress further degradation resulting from the SOC being kept in a high state.

The charging controller 46 is not limited to the configuration of limiting the charging current so that the charging time after the progress of degradation is equal to the charging time before the progress of degradation, and may limit the charging current so as to at least reduce the amount of decrease in the charging time, as described above (see FIG.

2D). This configuration makes it possible to increase the charging time from start of charging to end of charging compared with a configuration of not limiting the charging current, and accordingly it is possible to shorten the time during which the SOC is kept at 100% after charging.

With the configuration of making the charging time after the progress of degradation equal to that before the progress of degradation, the time allowed to be used for charging can be effectively used to a maximum extent, and degradation resulting from the SOC kept in a high state can be suppressed more effectively.

Figure 4:
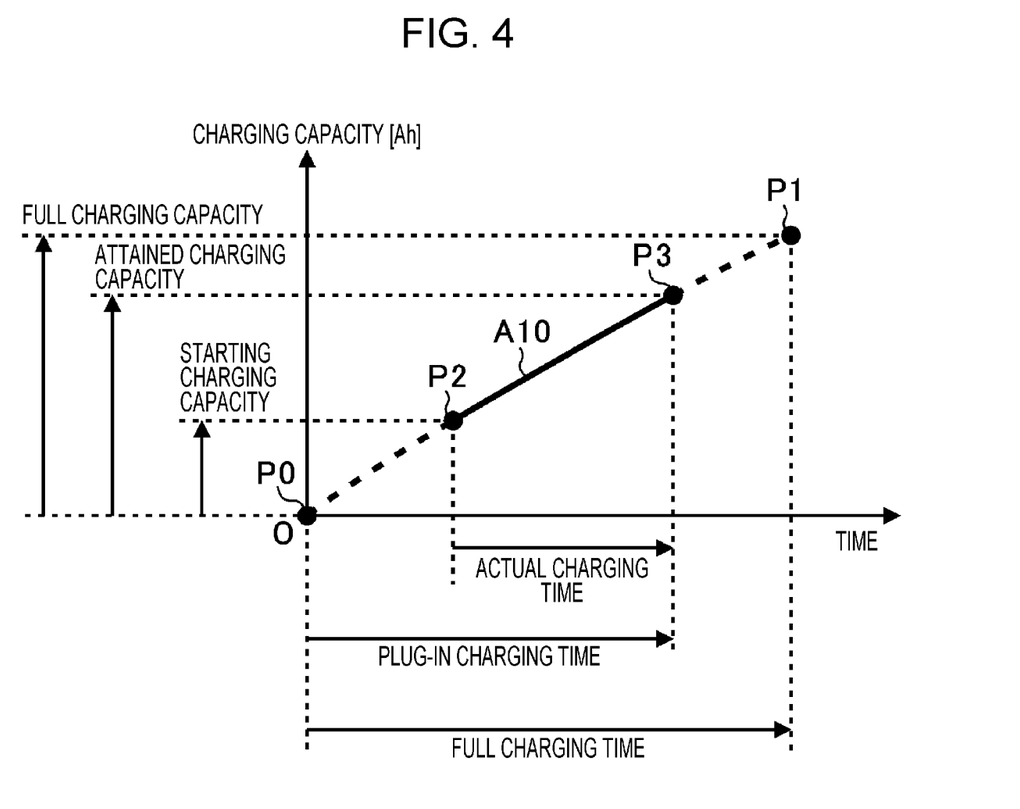
FIG. 4 is a diagram describing a definition of elements related to derivation of a limit value of charging current.

FIG. 4 is a diagram describing a definition of elements related to derivation of a limit value of charging current. In FIG. 4, a point P0 indicates a state in which the SOC is 0%. A point P1 indicates a state in which the SOC is 100%. A point P2 indicates an example of a charging starting time. A point P3 indicates an example of a charging ending time. A solid line A10 indicates an example of a temporal transition of charging capacity from start of charging to end of charging.

As illustrated in FIG. 4, a full charging capacity indicates the amount of charge when the SOC is 100%, with the amount of charge when the SOC is 0% being a reference amount. In other words, a full charging capacity indicates the amount of charge that can be supplied until the SOC reaches 100% from 0%. A full charging time indicates a time until the SOC reaches 100% from 0% through charging. In other words, a full charging time indicates a charging time used for charging for the full charging capacity.

A starting charging capacity indicates the amount of charge when charging actually starts, with the amount of charge when the SOC is 0% being a reference amount. An attained charging capacity indicates the amount of charge when charging actually ends, with the amount of charge when the SOC is 0% being a reference amount. That is, the amount of charge newly accumulated in the in-vehicle battery 20 through actual charging corresponds to a value calculated by subtracting the starting charging capacity from the attained charging capacity.

An actual charging time indicates an elapsed time from when charging actually starts to when charging actually ends. A plug-in charging time indicates a time used for charging for the attained charging capacity. If charging starts with the SOC being higher than 0%, the plug-in charging time is longer than the actual charging time.

In the example in FIG. 4, charging ends before the SOC reaches 100%, that is, before full charging is completed. In this case, the attained charging capacity is smaller than the full charging capacity. In contrast, if charging is executed until the SOC reaches 100%, that is, if full charging is executed, the attained charging capacity has a value equal to the full charging capacity.

For example, a charging map indicating relationships among individual parameters of the in-vehicle battery 20, such as a voltage, a current, an SOC, a charging capacity, and a charging time, is created in advance and is stored in the memory 44. The charging map indicates, for example, a plurality of lines indicating correlations among the parameters. The charging controller 46 refers to the charging map and derives an estimated value of plug-in charging time or the like.

The memory 44 stores a limit value of charging current. The charging controller 46 determines, every time charging ends, whether a predetermined condition indicating a progress of degradation of the in-vehicle battery 20 is satisfied. If the predetermined condition is satisfied, the charging controller 46 newly derives a limit value of charging current, and updates the limit value of charging current stored in the memory 44. Hereinafter, a flow of an operation of the charging controller 46 will be described. Also, derivation of a limit value of charging current will be described in detail.

Figure 5:
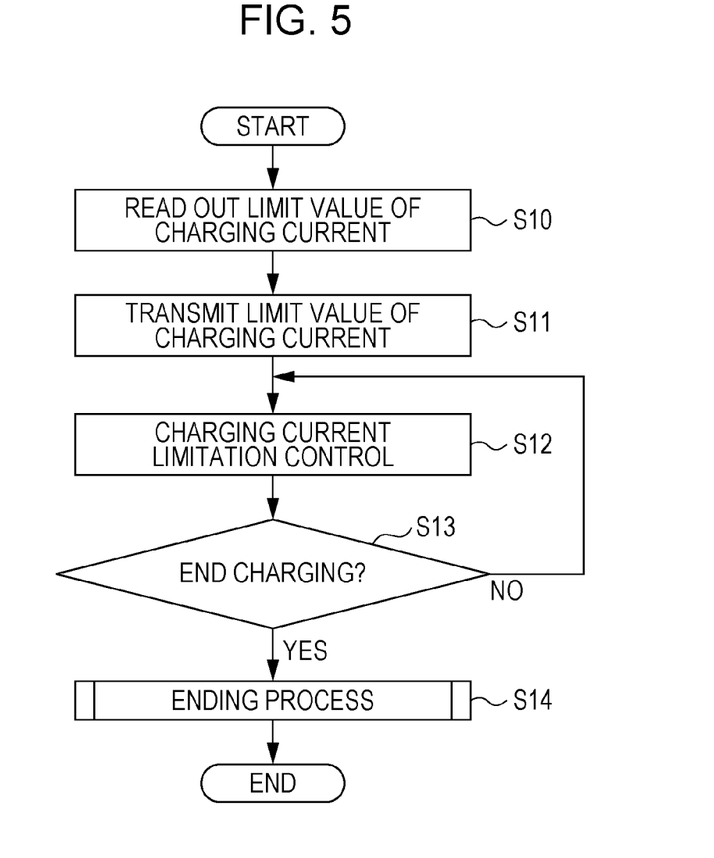
FIG. 5 is a flowchart describing a flow of an operation of the charging controller.

FIG. 5 is a flowchart describing a flow of an operation of the charging controller 46. The charging controller 46 executes a series of steps illustrated in FIG. 5 in response to an instruction to start charging after the charging connector 32 has been coupled to the charging inlet 40. When the series of steps illustrated in FIG. 5 has been executed once, it means that charging has been executed once. Note that "last charging" means a charging process immediately preceding the charging that is presently executed.

First, the charging controller 46 reads out a limit value of charging current from the memory 44 (S10). Subsequently, the charging controller 46 transmits the read out limit value of charging current to the facility controller 34 (S11). Subsequently, the charging controller 46 starts executing charging current limitation control of executing charging with a charging current of the limit value or less (S12). The charging controller 46 continues the charging current limitation control until a charging end condition is satisfied (NO in S13). The charging end condition is that, for example, the SOC of the in-vehicle battery 20 is higher than or equal to a predetermined SOC indicating end of charging. The charging end condition may be receipt of an end instruction through a user operation.

If the charging end condition is satisfied (YES in S13), the charging controller 46 executes an ending process (S14) and then ends the series of steps. The ending process includes a process related to updating the limit value of charging current. The ending process will be described in detail below.

Figure 6:
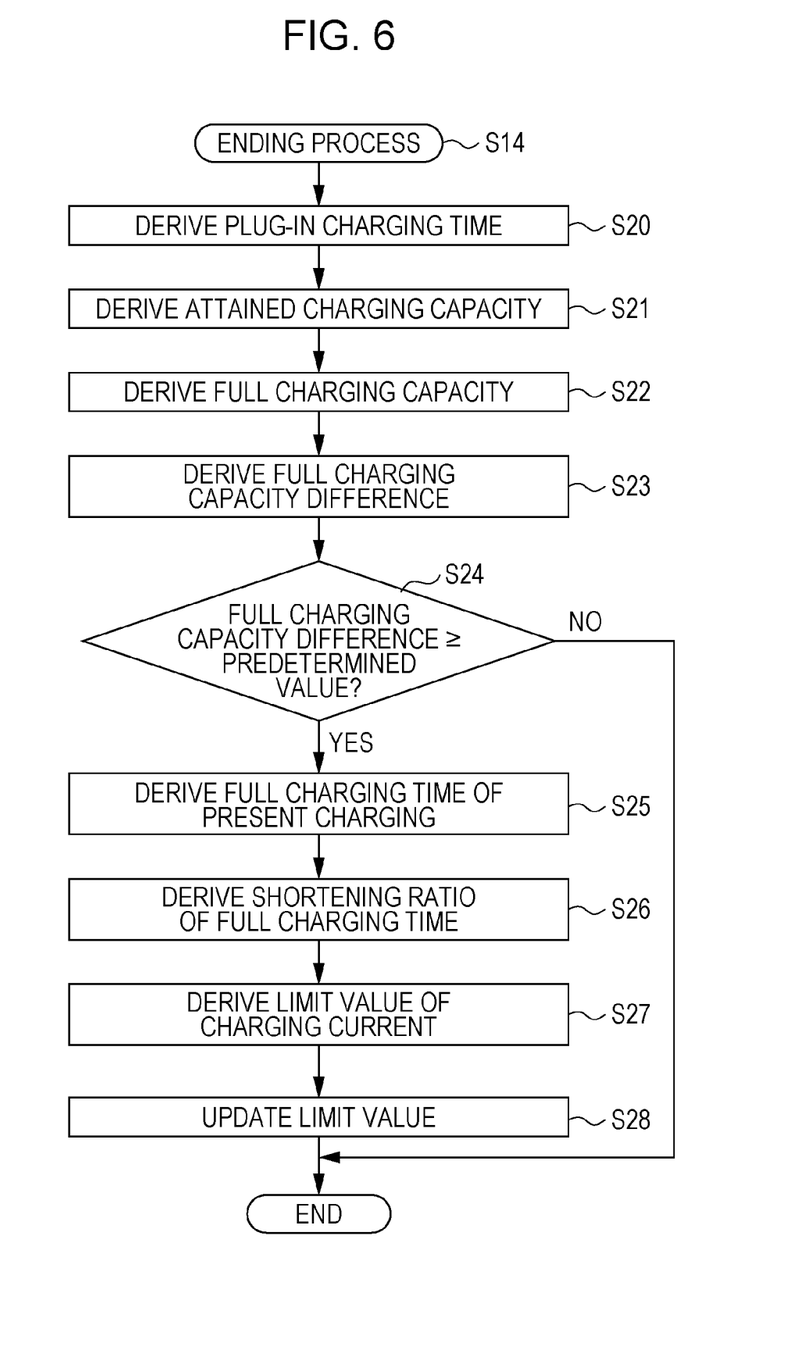
FIG. 6 is a flowchart describing a flow of an ending process.

FIG. 6 is a flowchart describing a flow of the ending process (S14). First, the charging controller 46 derives a plug-in charging time related to the present charging (S20). For example, the charging controller 46 derives the plug-in charging time by applying the SOC at start of charging, the SOC at end of charging, an actual charging current, and so forth to the charging map. Although not illustrated in FIG. 6, the charging controller 46 stores the derived plug-in charging time in the memory 44.

Subsequently, the charging controller 46 derives an attained charging capacity related to the present charging (S21). For example, the charging controller 46 derives the attained charging capacity by applying the voltage of the in-vehicle battery 20 at end of charging, the SOC at end of charging, an actual charging current, the plug-in charging time of the present charging, and so forth to the charging map. Although not illustrated in FIG. 6, the charging controller 46 stores the derived attained charging capacity in the memory 44.

Subsequently, the charging controller 46 derives a full charging capacity related to the present charging (S22). For example, the charging controller 46 derives the full charging capacity by applying the SOC at end of charging, the attained charging capacity of the present charging, and so forth to the charging map. Although not illustrated in FIG. 6, the charging controller 46 stores the derived full charging capacity in the memory 44.

Subsequently, the charging controller 46 reads out the full charging capacity of the last charging from the memory 44, and subtracts the full charging capacity of the present charging from the full charging capacity of the last charging (full charging capacity of last charging—full charging capacity of present charging), thereby deriving a full charging capacity difference (S23).

Subsequently, the charging controller 46 determines whether the full charging capacity difference is larger than or equal to a predetermined value (S24). The process in step S24 corresponds to a process of determining whether the predetermined condition indicating a progress of degradation of the in-vehicle battery 20 is satisfied. If the full charging capacity difference is smaller than the predetermined value (NO in S24), the charging controller 46 determines that there is no progress of degradation of the in-vehicle battery 20 between the last charging and the present charging, and ends the ending process. In this case, the limit value of charging current is not updated.

If the full charging capacity difference is larger than or equal to the predetermined value (YES in S24), the charging controller 46 determines that there is progress of degradation of the in-vehicle battery 20 between the last charging and the present charging, and executes step S25 and the following steps.

In step S25, the charging controller 46 derives the full charging time of the present charging by using the following equation (1). Although not illustrated in FIG. 6, the charging controller 46 stores the derived full charging time of the present charging in the memory 44.

$$\text{Full charging time [h] of present charging} = \text{Full charging capacity [Ah] of present charging/Attained charging capacity [Ah] of present charging} \times \text{Plug-in charging time [h] of present charging} \quad (1)$$

Subsequently, the charging controller 46 divides the full charging time of the present charging by the full charging time of the last charging (full charging time of present charging/full charging time of last charging), thereby deriving a shortening ratio of the full charging time (S26). The shortening ratio of the full charging time indicates the degree of progress of degradation of the in-vehicle battery 20 from the last charging to the present charging. For example, if there is progress of degradation between the last charging and the present charging, the full charging time of the present charging is shorter than the full charging time of the last charging. Thus, a smaller value of the shortening ratio of the full charging time indicates a higher degree of progress of degradation.

Subsequently, the charging controller 46 multiplies the limit value of charging current of the last charging by the shortening ratio of the full charging time as expressed by the following equation (2), thereby newly deriving a limit value of charging current (S27). That is, the charging controller 46 decreases the limit value of charging current in accordance with the degree of progress of degradation.

$$\text{Limit value of charging current} = \text{Limit value of charging current of last charging} \times \text{Shortening ratio of full charging time} \quad (2)$$

The charging controller 46 stores the limit value of charging current newly derived in step S27 in the memory 44 to update the limit value of charging current (S28), and ends the ending process. Accordingly, the charging current at the next charging and thereafter is limited to the updated limit value or smaller.

As described above, the charging controller 46 of the charging device 10 according to the present embodiment limits the charging current so as to reduce the amount of decrease in charging time resulting from an increase in the number of executions of charging. Accordingly, in the charging device 10 according to the present embodiment, it is possible to reduce the amount of heat generation of the in-vehicle battery 20 and to suppress the progress of degradation of the in-vehicle battery 20 resulting from an increase in the temperature of the in-vehicle battery 20.

Thus, with the charging device 10 according to the present embodiment, it is possible to suppress degradation of the in-vehicle battery 20.

The charging controller 46 of the charging device 10 according to the present embodiment limits, when executing charging, the charging current so that the charging time of the present charging is equal to the charging time of the last charging. Accordingly, the charging current is limited to a maximum extent. Thus, in the charging device 10 according to the present embodiment, it is possible to suppress degradation of the in-vehicle battery 20 to a maximum extent.

The charging controller 46 of the charging device 10 according to the present embodiment derives a full charging time at every charging, and updates the limit value of charging current on the basis of the shortening ratio of the full charging time of the present charging with respect to the full charging time of the last charging. Accordingly, in the charging device 10 according to the present embodiment, the limit value of charging current can be updated to a value suitable for the degree of progress of degradation, and degradation of the in-vehicle battery 20 can be suppressed more appropriately.

The embodiment of the disclosure has been described with reference to the attached drawings. Obviously, the disclosure is not limited to the embodiment. It is obvious that a person skilled in the art could conceive of various changes or modifications within the scope described in the claims, and it is to be understood that the changes or modifications are included in the technical scope of the disclosure.

For example, the charging controller 46 according to the above embodiment compares the full charging capacity of the last charging and the full charging capacity of the present charging with each other, thereby determining whether degradation has progressed. Alternatively, the charging controller 46 may compare the full charging capacity of initial charging and the full charging capacity of the present charging with each other, thereby determining whether degradation has progressed. Alternatively, the charging controller 46 may compare the full charging capacity of charging when the charging current has been updated and the full charging capacity of the present charging with each other, thereby determining whether degradation has progressed.

The charging controller 46 according to the above embodiment determines that degradation has progressed and updates the limit value of charging current if the full charging capacity difference is larger than or equal to the predetermined value. Alternatively, the charging controller 46 may derive and update the limit value of charging current every time regardless of whether the full charging capacity difference is larger than or equal to the predetermined value.

The charging controller 46 according to the above embodiment derives the limit value of charging current on the basis of the shortening ratio of the full charging time that is derived by dividing the full charging time of the present charging by the full charging time of the last charging. Alternatively, the charging controller 46 may derive the shortening ratio of the full charging time by dividing the full charging time of the present charging by an initial full charging time and may multiply the shortening ratio of the full charging time by an initial limit value, thereby deriving a new limit value. Alternatively, the charging controller 46 may derive the shortening ratio of the full charging time by dividing the full charging time of the present charging by the full charging time when the limit value has been updated and may multiply the shortening ratio of the full charging time by the limit value when the limit value has been updated, thereby deriving a new limit value. That is, the charging controller 46 may update the limit value of charging current on the basis of the shortening ratio of the full charging time of the present charging with respect to the full charging time of previous charging.

The charging controller 46 illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the charging controller 46. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 1.

The invention claimed is:

1. A charging device to be applied to a vehicle, the charging device comprising:
   a charging inlet disposed in the vehicle and configured to be coupled to a charging connector outside the vehicle; and
   a charging controller disposed in the vehicle and configured to execute charging of an in-vehicle battery disposed in the vehicle with power fed from an outside of the vehicle through the charging inlet, wherein
   the charging controller is configured to:
      execute a first charging of the in-vehicle battery;
      determine a first full charging capacity of the in-vehicle battery in response to completion of the first charging;
      execute a second charging of the in-vehicle battery after the first charging;
      determine a second full charging capacity of the in-vehicle battery in response to completion of the second charging;
      calculate an upper limit value of a charging current based on a difference between the first full charging capacity and the second full charging capacity; and
      execute a third charging of the in-vehicle battery after the second charging by using the charging current equal to or less than the calculated upper limit value in response to a calculation of the upper limit value.

2. The charging device according to claim 1, wherein the first full charging capacity indicates a maximum amount of charge of the in-vehicle battery at a time of the completion of the first charging,
   wherein the second full charging capacity indicates the maximum amount of charge of the in-vehicle battery at a time of the completion of the second charging, and
   wherein the charging controller is further configured to calculate the upper limit value such that the upper limit value decreases as a reduction amount of the second full charging capacity relative to the first full charging capacity increases.

3. The charging device according to claim 2, wherein the charging controller is further configured to:
   determine the first full charging capacity based on a first elapsed time and a first amount of charge, wherein the first elapsed time being an elapsed time from a start to the completion of the first charging, and the first amount of charge being an amount of charge supplied to the in-vehicle battery during the first charging; and
   determine the second full charging capacity based on a second elapsed time and a second amount of charge, wherein the second elapsed time being an elapsed time from a start to the completion of the second charging, and the second amount of charge being an amount of charge supplied to the in-vehicle battery during the second charging.

4. The charging device according to claim 3, wherein the charging controller is further configured to:
   in response to determination of the first full charging capacity and the second full charging capacity, calculate a full charging capacity difference by subtracting the second full charging capacity from the first charging capacity;
   determine whether the full charging capacity difference is equal to or greater than a predetermined threshold;
   in response to determining that the full charging capacity difference is equal to or greater than the predetermined threshold, i) calculate the upper limit value, and ii) execute the third charging by using the charging current equal to or less than the calculated upper limit value; and
   in response to determining that the full charging capacity difference is not equal to or greater than the predetermined threshold, execute a fourth charging of the in-vehicle battery after the second charging by using the charging current equal to or less than the upper limit value of the charging current in the second charging.

5. The charging device according to claim 1, wherein the charging controller is further configured to calculate the upper limit value based on a shortening ratio of a second full charging time with respect to a first full charging time, the first full charging time being a time to be taken for charging for the first full charging capacity, the second full charging time being a time to be taken for charging for the second full charging capacity.

6. The charging device according to claim 5, wherein the charging controller is further configured to:
   in response to determination of the first full charging capacity and the second full charging capacity, calculate a full charging capacity difference by subtracting the second full charging capacity from the first charging capacity;
   determine whether the full charging capacity difference is equal to or greater than a predetermined threshold;
   in response to determining that the full charging capacity difference is equal to or greater than the predetermined threshold, i) calculate the upper limit value, and ii) execute the third charging by using the charging current equal to or less than the calculated upper limit value; and
   in response to determining that the full charging capacity difference is not equal to or greater than the predetermined threshold, execute a fourth charging of the in-vehicle battery after the second charging by using the charging current equal to or less than the upper limit value of the charging current in the second charging.

7. A charging device to be applied to a vehicle, the charging device comprising:

a charging inlet disposed in the vehicle and configured to be coupled to a charging connector outside the vehicle; and circuitry disposed in the vehicle and configured to execute charging of an in-vehicle battery disposed in the vehicle with power fed from an outside of the vehicle through the charging inlet, wherein the circuitry is configured to:
  execute a first charging of the in-vehicle battery;
  determine a first full charging capacity of the in-vehicle battery in response to completion of the first charging;
  execute a second charging of the in-vehicle battery after the first charging;
  determine a second full charging capacity of the in-vehicle battery in response to completion of the second charging;
  calculate an upper limit value of a charging current based on the first full charging capacity and the second full charging capacity; and
  execute a third charging of the in-vehicle battery after the second charging by using the charging current equal to or less than the calculated upper limit value in response to a calculation of the upper limit value.

8. A charging device to be applied to a vehicle, the charging device comprising:
  a charging inlet disposed in the vehicle and configured to be coupled to a charging connector outside the vehicle; and
  circuitry disposed in the vehicle and configured to execute charging of an in-vehicle battery disposed in the vehicle with power fed from an outside of the vehicle through the charging inlet, wherein
  the circuitry is configured to:
    execute a first charging of the in-vehicle battery by using a charging current equal to or less than a first upper limit value;
    in response to completion of the first charging, determine a first full charging capacity of the in-vehicle battery;
    execute a second charging of the in-vehicle battery after the first charging by using the charging current equal to or less than the first upper limit value;
    in response to completion of the second charging, determine a second full charging capacity of the in-vehicle battery;
    calculate a second upper limit value of the charging current based on the first full charging capacity and the second full charging capacity, the second upper limit value being less than the first upper limit value; and
    in response to calculation of the second upper limit value, execute a third charging of the in-vehicle battery after the second charging by using the charging current equal to or less than the second upper limit value.

9. The charging device according to claim 8, wherein the first full charging capacity indicates a maximum amount of charge of the in-vehicle battery at a time of the completion of the first charging,
  wherein the second full charging capacity indicates the maximum amount of charge of the in-vehicle battery at a time of the completion of the second charging, and
  wherein the circuitry is further configured to calculate the second upper limit value such that the second limit value decreases as a reduction amount of the second full charging capacity relative to the first full charging capacity increases.

10. The charging device according to claim 9, wherein the circuitry is further configured to:
  determine the first full charging capacity based on a first elapsed time and a first amount of charge, wherein the first elapsed time being an elapsed time from a start to the completion of the first charging, and the first amount of charge being an amount of charge supplied to the in-vehicle battery during the first charging; and
  determine the second full charging capacity based on a second elapsed time and a second amount of charge, wherein the second elapsed time being an elapsed time from a start to the completion of the second charging, and the second amount of charge being an amount of charge supplied to the in-vehicle battery during the second charging.

11. The charging device according to claim 10, wherein the circuitry is further configured to:
  in response to determination of the first full charging capacity and the second full charging capacity, calculate a full charging capacity difference by subtracting the second full charging capacity from the first charging capacity;
  determine whether the full charging capacity difference is equal to or greater than a predetermined threshold;
  in response to determining that the full charging capacity difference is equal to or greater than the predetermined threshold, i) calculate the second upper limit value, and ii) execute the third charging by using the charging current equal to or less than the second upper limit value; and
  in response to determining that the full charging capacity difference is not equal to or greater than the predetermined threshold, execute a fourth charging of the in-vehicle battery after the second charging by using the charging current equal to or less than the first upper limit value.

12. The charging device according to claim 8, wherein the circuitry is further configured to calculate the second upper limit value based on a shortening ratio of a second full charging time with respect to a first full charging time, the first full charging time being a time to be taken for charging for the first full charging capacity, the second full charging time being a time to be taken for charging for the second full charging capacity.

13. The charging device according to claim 12, wherein the circuitry is further configured to:
  in response to determination of the first full charging capacity and the second full charging capacity, calculate a full charging capacity difference by subtracting the second full charging capacity from the first charging capacity;
  determine whether the full charging capacity difference is equal to or greater than a predetermined threshold;
  in response to determining that the full charging capacity difference is equal to or greater than the predetermined threshold, i) calculate the second upper limit value, and ii) execute the third charging by using the charging current equal to or less than the second upper limit value; and
  in response to determining that the full charging capacity difference is not equal to or greater than the predetermined threshold, execute a fourth charging of the in-vehicle battery after the second charging by using the charging current equal to or less than the first limit value.

14. The charging device according to claim 8, wherein the circuitry is further configured to calculate the second upper limit value based on a shortening ratio of a second full charging time with respect to a first full charging time, the first full charging time being a time to be taken for charging for the first full charging capacity by using the charging current equal to or less than the first limit value, the second full charging time being a time to be taken for charging for the second full charging capacity by using the charging current equal to or less than the first limit value.

15. The charging device according to claim 14, wherein the circuitry is further configured to calculate the second upper limit value by multiplying the first upper limit value by the shortening ratio.

16. The charging device according to claim 15, wherein the circuitry is further configured to:
    in response to determination of the first full charging capacity and the second full charging capacity, calculate a full charging capacity difference by subtracting the second full charging capacity from the first charging capacity;
    determine whether the full charging capacity difference is equal to or greater than a predetermined threshold;
    in response to determining that the full charging capacity difference is equal to or greater than the predetermined threshold, i) calculate the second upper limit value, and ii) execute the third charging by using the charging current equal to or less than the second upper limit value; and
    in response to determining that the full charging capacity difference is not equal to or greater than the predetermined threshold, execute a fourth charging of the in-vehicle battery after the second charging by using the charging current equal to or less than the first limit value.

17. The charging device according to claim 8, wherein the circuitry is further configured to:
    determine the first full charging capacity as an amount of charge required to bring a state of charge (SOC) of the in-vehicle battery from 0% to 100% at a time of the completion of the first charging;
    determine the second full charging capacity as an amount of charge required to bring the SOC from 0% to 100% at a time of the completion of the second charging;
    calculate a shortening ratio of a second full charging time with respect to a first full charging time, the first full charging time being a time to be taken for charging for the first full charging capacity by using the charging current equal to or less than the first limit value, the second full charging time being a time to be taken for charging for the second full charging capacity by using the charging current equal to or less than the first limit value; and
    calculate the second upper limit value by multiplying the first upper limit value by the shortening ratio.

* * * * *